United States Patent Office 3,143,480
Patented Aug. 4, 1964

3,143,480
PRODUCTION OF 6β-HYDROXY-Δ³-A-NOR-PREGNENE-2,20-DIONE
Allen I. Laskin and Frank L. Weisenborn, Somerset, N.J., assignors to Olin Mathieson Chemical Corporation, New York, N.Y., a corporation of Virginia
No Drawing. Filed Apr. 30, 1962, Ser. No. 191,250
1 Claim. (Cl. 195—51)

This invention relates to steroids of the A-norpregnane series and to a method for producing such compounds. More particularly this invention relates to 6β-hydroxy-Δ³-A-norpregnene-2,20-dione, and derivatives thereof. Such derivatives include esters thereof with hydrocarbon carboxylic acids and organic sulfonic acids as well as the corresponding 6-keto compound.

According to this invention, 6β-hydroxy-Δ³-A-norpregnene-2,20-dione is first prepared by subjecting A-norprogesterone to the action of enzymes of a microorganism of the genus Cokeromyces, e.g. *Cokeromyces recurvatus*, under oxidizing conditions. The oxidation may be effected either by including the starting material in an aerobic culture of the microorganism or by bringing together, in an aqueous medium the A-norprogesterone, air and enzymes of non-proliferating cells of the microorganism.

In general, the conditions for culturing the microorganism of the genus Cokeromyces for the purposes of this invention are the same as those for obtaining cultures of actinomycetes for the production of antibiotics or vitamin $B_{12}$, i.e., the microorganism is aerobically grown in contact with a suitable fermentation medium. A suitable fermentation medium comprises a source of nitrogen and a source of carbon and energy. The latter may be a carbohydrate such as sucrose, molasses, glucose, maltose, starch or dextrin, a fatty acid, a fat and/or the steroid itself. Preferably, however, the medium includes an assimilable source of carbon and energy in addition to the steroid.

Organic sources of nitrogen may be used, e.g. soybean meal, cornsteep liquor, meat extract and/or distillers solubles, or synthetic materials may be used, i.e. simple, synthesizable organic or inorganic compounds such as ammonium salts, alkali nitrates, amino acids or urea.

An adequate sterile air supply should be maintained during fermentation, for example by the conventional methods of exposing large surfaces of the medium to air or by utilizing submerged aerated cultures. The A-norprogesterone may be added to the culture during the incubation period or included in the medium prior to sterilization or innoculation. The preferred range of concentration of the starting material in the culture is about 0.01 to about 0.10%, but concentrations within a broader range may also be used. The culture period may vary considerably, the range of about 6 to 96 hours being feasible.

The culturing of A-norprogesterone with a microorganism of the genus Cokeromyces as described above yields 6β-hydroxy-Δ³-A-norpregnene-2,20-dione. This compound forms esters with organic acids, particularly organic hydrocarbon carboxylic acids, especially those with less than 10 carbon atoms. Such organic hydrocarbon carboxylic acids include the lower alkanoic acids as, for example, acetic, propionic, butyric and enanthic acids, lower alkenoic acids, for example, propenoic acid, aralkanoic acids, preferably phenyl-lower alkanoic acids, for example, α-toluic and β-phenylpropionic acids, cycloalkane carboxylic acids, preferably having 4 to 6 carbon atoms in the ring, and aromatic acids, for example, benzoic and o-, m-, or p-toluic acids. Sulfonic acid derivatives may also be formed. These include for example alkanesulfonic acids such as methanesulfonic acid, ethanesulfonic acid as well as arylsulfonic acids such as benzenesulfonic acid and toluenesulfonic acid.

The esters of 6β-hydroxy-Δ³-A-norpregnene-2,20-dione are prepared in conventional manner, for example by treatment with the appropriate acid anhydride, acyl halide or sulfonyl halide in an organic solvent, preferably an organic base such as pyridine.

6β-hydroxy-Δ³-A-norpregnene-2,20-dione may be converted to Δ³-A-norpregnene-2,6,20-trione by oxidation, e.g. with chromic acid and sulfuric acid, in an organic solvent such as acetone.

The compounds of this invention are physiologically active compounds which have antiandrogenic activity, i.e. they inhibit the action of androgens such as testosterone and can be used to inhibit the development of male characteristics or hyperandrogenic acne due to the presence of an excess amount of androgen such as testosterone. They may be administered topically or systemically in conventional forms such as ointments, creams, tablets, elixirs, capsules, injectables and the like by incorporating an appropriate concentration based on the activity of the particular compound and requirements of the patient together with conventional vehicles, excipients and the like.

The following examples are illustrative of the invention. All temperatures are expressed in degrees centigrade.

EXAMPLE 1

*6β-Hydroxy-Δ³-A-Norpregnene-2,20-Dione*

(I) FERMENTATION (a) Surface growth from a three-week old agar slant culture of *Cokeromyces recurvatus* (from Centraalbureau voor Schimmel-cultures, Baarn, Holland) the slant containing as a nutrient medium (A): glucose, 10 g.; Difco yeast extract, 2.5; $K_2HPO_4$, 1 g.; agar, 20 g.; and distilled water to 1 l., is suspended in 2.5 ml. of an 0.01% sodium lauryl sulfate aqueous solution. One milliliter portions of the suspension is used to inoculate two 250 ml. conical flasks, each containing 50 ml. of the following sterilized nutrient medium (B): dextrose, 10 g.; cornsteep liquor, 6 g.; $NH_4H_2PO_4$, 3 g.; Difco yeast extract, 2.5 g.; $CaCl_3$, 2.5; and distilled water to 1 l. After 72 hours of incubation at 25° C. with continuous rotary agitation (280 cycles per minute, 2 inch radius), 10% (vol./vol.) transfers are made to twelve 250 ml. conical flasks each containing 50 ml. of fresh sterilized medium B. These are incubated under the conditions described above for 96 hours, after which another 10% (vol./vol.) transfer is made to 100 additional 250 ml. flasks containing 50 ml. of fresh sterilized medium B. A-norprogesterone is introduced by adding to each flask in 0.25 ml. of a sterile solution of the steroid in N,N-dimethylformamide (60 mg./ml.) so that the medium is supplemented with 300 μg./ml. of steroid. After 6 days of further incubation, the contents of the flasks are pooled and filtered through a Seitz clarifying pad. The flasks, mycelium and pad are washed with successive 50 ml. portions of warm water. The combined filtrate and washings (pH 7.3) have a volume of 5,750 ml.

(b) *Isolation and characterization.*—The combined filtrate and washings (5,750 ml.) are extracted three times with 1 l. portions of chloroform. The chloroform extracts are washed with water, dried over sodium sulfate and concentrated to dryness under vacuum leaving 964 mg. of crude product. The substance is then chromatographed on 40 g. of acid-washed alumina. Elution of the column with 50–75% chloroform-benzene gives about 420 mg. of pure 6β-hydroxy-Δ³-A-norpregnene-2,20-dione after crystallization from acetone-hexane, M.P. 214–215°, $[\alpha]_D + 24°$ (chloroform), $$\lambda_{max.}^{EtOH} \ 232 \ m\mu \ (\epsilon = 13,300)$$

*Analysis.*—Calcd. for $C_{20}H_{28}O_3$: C, 75.91; H, 8.92. Found: C, 75.93; H, 9.09.

EXAMPLE 2

*$\Delta^3$-A-Norpregnene-2,6,20-Trione*

A solution of 132 mg. of 6β-hydroxy-$\Delta^3$-A-norpregnene-2,20-dione in 50 ml. of acetone is treated dropwise with stirring with a slight excess of a chromic acid-sulfuric acid in acetone solution. The precipitate of chromic salts is centrifuged off and the supernatant solution neutralized with ammonium hydroxide and concentrated to dryness under vacuum. The residue is dissolved in chloroform, washed with water, dried over magnesium sulfate and concentrated. The product is recrystallized from acetone-hexane to yield about 102 mg. of pure $\Delta^3$-A-norpregnene-2,6,20-trione, M.P. 226–227°, $[\alpha]_D +88°$ (chloroform), $\lambda_{max.}^{EtOH}$ 244 m$\mu$ ($\epsilon = 9,900$).

*Analysis.*—Calcd. for $C_{20}H_{26}O_3$: C, 76.40; H, 8.34. Found: C, 76.52; H, 8.43.

EXAMPLE 3

*6β-Acetoxy-$\Delta^3$-A-Norpregnene-2,20-Dione*

6β-hydroxy-$\Delta^3$-A-norpregnene-2,20-dione (25 mg.) is dissolved in 5 ml. of pyridine and 2.5 ml. of acetic anhydride and the solution allowed to stand at room temperature overnight. The solvents are removed under vacuum and the residue distributed between chloroform and water. The chloroform extract is dried over magnesium sulfate, concentrated to dryness and the product recrystallized from acetone-hexane to give 6β-acetoxy-$\Delta^3$-A-norpregnene-2,20-dione.

EXAMPLE 4

*6β-Mesyloxy-$\Delta^3$-A-Norpregnene-2,20-Dione*

6β-hydroxy-$\Delta^3$-A-norpregnene-2,20-dione (50 mg.) is dissolved in 1.5 ml. of pyridine, the solution cooled to 0° C., and 0.1 ml. of methanesulfonyl chloride added. This solution is allowed to stand in the refrigerator for 16 hours, poured into ice water, and extracted with chloroform. The chloroform extract is washed with dilute hydrochloric acid, water, dried over magnesium sulfate and concentrated to dryness in vacuo. The residue is recrystallized from ethyl-acetate-hexane to yield 6β-mesyloxy-$\Delta^3$-A-norpregnene-2,20-dione.

What is claimed is:

A process for producing 6β-hydroxy-$\Delta^3$-A-norpregnene-2,20-dione which comprises subjecting A-norprogesterone to the action of enzymes of the microorganism *Cokesomyces recurvatus* in an organic nutrient medium in the presence of oxygen and a source of nitrogen.

References Cited in the file of this patent
UNITED STATES PATENTS

| | | |
|---|---|---|
| 2,950,289 | Weisenborn | Aug. 23, 1960 |
| 3,005,018 | Weisenborn et al. | Oct. 17, 1961 |